United States Patent
Choi

(10) Patent No.: US 9,751,517 B2
(45) Date of Patent: Sep. 5, 2017

(54) BRAKE CONTROL METHOD FOR HYBRID ELECTRIC VEHICLE

(71) Applicant: Hyundai Motor Company, Seoul (KR)

(72) Inventor: Jin Hwan Choi, Ansan-si (KR)

(73) Assignee: Hyundai Motor Company, Seoul (KR)

(*) Notice: Subject to any disclaimer, the term of this patent is extended or adjusted under 35 U.S.C. 154(b) by 118 days.

(21) Appl. No.: 14/937,731

(22) Filed: Nov. 10, 2015

(65) Prior Publication Data

US 2016/0280201 A1 Sep. 29, 2016

(30) Foreign Application Priority Data

Mar. 23, 2015 (KR) ........................ 10-2015-0039904

(51) Int. Cl.
| | |
|---|---|
| *B60W 20/00* | (2016.01) |
| *B60W 30/02* | (2012.01) |
| *B60W 10/188* | (2012.01) |
| *B60W 30/18* | (2012.01) |
| *B60W 10/08* | (2006.01) |

(Continued)

(52) U.S. Cl.
CPC .......... *B60W 20/00* (2013.01); *B60W 10/08* (2013.01); *B60W 10/184* (2013.01); *B60W 10/188* (2013.01); *B60W 20/14* (2016.01); *B60W 30/02* (2013.01); *B60W 30/18127* (2013.01); *B60W 2540/12* (2013.01); *B60W 2710/083* (2013.01); *B60W 2710/182* (2013.01); *B60Y 2300/89* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 8,366,210 B2* | 2/2013 | Maki .................... | B60K 6/445 303/151 |
| 8,998,352 B2* | 4/2015 | Imamura ............... | B60T 8/1755 303/115.4 |

(Continued)

FOREIGN PATENT DOCUMENTS

| | | |
|---|---|---|
| JP | 2008-253030 A | 10/2008 |
| JP | 2012-91548 A | 5/2012 |

(Continued)

*Primary Examiner* — Rami Khatib
*Assistant Examiner* — Nicholas K Wiltey
(74) *Attorney, Agent, or Firm* — Morgan, Lewis & Bockius LLP

(57) ABSTRACT

A brake control method for a hybrid electric vehicle including a control mode of a first interval to control regenerative brake of a motor may include sensing, by an Electronic Stability Control system controller (ESC ECU), a time when a wheel brake pressure detected by a pressure sensor of a wheel brake is '0' after entering a control mode of a second interval, determining, by the ESC ECU, a pedal stroke in which the wheel brake pressure is '0' from a 'pedal stroke Vs wheel brake pressure' map, changing and setting, by the ESC ECU, the pedal stroke in which the wheel brake pressure is '0' to an upper threshold stroke value of a 'pedal stroke Vs pressure' map, and re-entering the control mode of the first interval, when the pedal stroke depending on the brake pedal operation decreases to the changed upper threshold stroke value or less.

5 Claims, 12 Drawing Sheets

(51) Int. Cl.
*B60W 10/184* (2012.01)
*B60W 20/14* (2016.01)

(56) References Cited

U.S. PATENT DOCUMENTS

| | | | | |
|---|---|---|---|---|
| 2004/0164612 | A1* | 8/2004 | Worrel | B60L 7/26 303/177 |
| 2005/0269875 | A1* | 12/2005 | Maki | B60L 7/26 303/152 |
| 2007/0228821 | A1* | 10/2007 | Maki | B60K 6/445 303/151 |
| 2012/0139330 | A1* | 6/2012 | Morishita | B60T 1/10 303/3 |
| 2013/0020857 | A1* | 1/2013 | Fujii | B60L 7/14 303/3 |
| 2013/0041565 | A1* | 2/2013 | Fujiki | B60T 1/10 701/70 |
| 2016/0200295 | A1* | 7/2016 | Nishikawa | B60T 1/10 701/70 |
| 2016/0339887 | A1* | 11/2016 | Okano | B60T 8/4077 |

FOREIGN PATENT DOCUMENTS

| | | |
|---|---|---|
| JP | 2012-179961 A | 9/2012 |
| KR | 10-0721060 B1 | 5/2007 |
| KR | 10-2008-0051492 A | 6/2008 |
| KR | 10-2010-0113725 A | 10/2010 |
| KR | 10-2012-0053216 A | 5/2012 |
| KR | 10-1371898 B1 | 3/2014 |
| KR | 10-1402707 B1 | 5/2014 |
| KR | 10-2015-0019741 A | 2/2015 |

* cited by examiner

BRAKE CONTROL METHOD FOR HYBRID ELECTRIC VEHICLE

CROSS-REFERENCE TO RELATED APPLICATION

The present application claims priority to Korean Patent Application No. 10-2015-0039904 filed Mar. 23, 2015, the entire contents of which is incorporated herein for all purposes by this reference.

BACKGROUND OF THE INVENTION

Field of the Invention

The present invention relates to a brake control method for a hybrid electric vehicle. More particularly, the present invention relates to an enhanced brake control method to cope with a hydraulic hysteresis phenomenon depending on a pedal stroke when entering a control mode to generate both regenerative brake force and hydraulic brake force from a control mode to generate only the regenerative brake force by increasing a brake pedal stroke in the hybrid electric vehicle in which a regenerative brake cooperation control is performed and thereafter, re-entering a control mode to generate only the regenerative brake force.

Description of Related Art

In a hybrid electric vehicle, when a brake control for decelerating or stopping a vehicle is executed while driving, a regenerative brake is executed by a motor to charge a battery.

A total brake amount determined by a pedal stroke generated as a driver steps a brake pedal is distributed to a regenerative brake amount and a hydraulic brake amount (friction brake amount) executed by hydraulic pressure (wheel brake pressure) supplied to each wheel brake (hydraulic brake), and as a result, a cooperation control is executed.

In some existing hybrid electric vehicles, since a regenerative brake cooperation control is not performed when braking a vehicle, an effect is not high in fuel enhancement by the regenerative brake, but thereafter, a fuel enhancement rate can be increased by applying while regenerative brake cooperation control technology and the regenerative brake cooperation control is performed through a hydraulic booster in a brake control device of the hybrid electric vehicle in the related art.

That is, in order to satisfy total brake force (driver's required brake force) depending on a driver's request, the regenerative brake cooperation control to generate the hydraulic brake force (friction brake force by a wheel brake which is the hydraulic brake) with basic brake force by the hydraulic booster and simultaneously generate regenerative brake force through a regenerative brake control is performed.

In this case, when the hydraulic booster fails, an electronic stability control system (ESC) that generates auxiliary brake force by driving a motor and a pump is used.

However, the brake control device in the related art may recover some of energy lost while braking to provide a higher fuel efficiency enhancement effect than the case where the regenerative brake cooperation control is not performed, but since the hydraulic booster directly controls pressure from a master cylinder to a wheel brake, a pedal simulator for providing pedal operation feel needs to be provided, and as a result, cost increases, thereby decreasing price competitiveness.

In order to solve the problem, the prior art discloses technology that allows an ESC to perform an anti-lock braking system (ABS) function, a traction control system (TCS) function, an ESC's own function, and a regenerative brake cooperation control function in the hybrid electric vehicle.

The brake control device of the hybrid electric vehicle that performs the regenerative brake cooperation control in the prior art includes a master cylinder generating brake hydraulic pressure depending on the pedal stroke, an ESC controlling the brake hydraulic pressure supplied to the wheel brake from the master cylinder while regenerative braking, and a wheel brake connected with the master cylinder through the ESC.

Herein, the ESC includes an outlet valve capable of discharging the brake hydraulic pressure of the wheel brake to a low pressure accumulator (LPA) during the regenerative brake cooperation control and an ESC pump supplying the brake hydraulic pressure of the LPA to the wheel brake as much as a decrease amount of the regenerative brake force when the regenerative brake force decreases, and the outlet valve is closed depending on the pedal stroke additionally generated to supply the brake hydraulic pressure to the wheel brake when the regenerative brake force has a maximum value.

The prior art presents a brake control method for a hybrid electric vehicle that stores the brake hydraulic pressure of the wheel brake in the LPA through the outlet valve of the ESC when the regenerative brake force increases in order to perform the regenerative brake cooperation control according to a pedal stroke signal, supplies the brake hydraulic pressure of the master cylinder to the wheel brake by closing the outlet valve according to the pedal stroke signal additionally generated when the regenerative brake force has the maximum value, and drives the ESC pump to supply the brake hydraulic pressure of the LPA to the wheel brake as much as the decrease amount of the regenerative brake force when the regenerative brake force decreases.

Herein, the pedal stroke signal is a signal output from a brake pedal stroke sensor and in the prior art, the pedal stroke signal depending on a brake pedal pressing degree of a driver is generated by adding the brake pedal stroke sensor and an ESC controller (ECU: electronic control unit) determines a brake will of the driver based on the pedal stroke signal.

FIG. 1 and FIG. 2 are diagrams illustrating a control mode for each brake interval presented in the prior art and as illustrated in FIG. 1 and FIG. 2, the control mode for each brake interval (brake force control mode) includes a first interval ① of performing braking only by the regenerative brake force, a second interval ② of generating the brake hydraulic pressure to satisfy an insufficient part with the hydraulic brake force (the brake force of the hydraulic brake, that is, the friction brake force of the wheel brake that operates by the hydraulic pressure in order to constantly maintain the regenerative brake force and satisfy the total brake force (driver's required brake force), and a third interval ③ of increasing the brake hydraulic pressure and the hydraulic brake force as much as the decrease amount of the regenerative brake force when the regenerative braking is released in order to satisfy the total brake force (driver's required brake force).

The first interval ① is an interval in which the driver's required brake force (alternatively, a driver's required brake torque amount) depending on a time is a deceleration of 0.1 g or less and in this interval, braking is available only by the regenerative brake force of the motor without the hydraulic brake force.

In the first interval ①, the brake hydraulic pressure supplied from the master cylinder is stored in the LPA by opening the outlet valve of the ESC to prevent the brake hydraulic pressure of the wheel brake from being increased.

In the second interval ②, the regenerative brake force is maintained at the maximum value (maximum regenerative brake force) formed through the increase of the regenerative brake force in the first interval and when the driver additionally presses the brake pedal, and as a result, when brake force larger than the regenerative brake force is required, the hydraulic brake force (hydraulic brake force) is appropriately increased and decreased to satisfy the driver's required brake force by generating the brake hydraulic pressure.

The second interval ② is an interval in which brake force larger than brake force which may be generated by the regenerative brake force is required and the brake hydraulic pressure of the wheel brake may be increased by receiving the brake hydraulic pressure of the master cylinder formed depending on the pedal operation amount of the driver by closing the outlet valve connected to the LPA.

The third interval ③ is an interval in which the regenerative brake is released, and as a result, the regenerative brake amount decreases and in this interval, the hydraulic brake force is increased as large as the decrease amount of the regenerative brake force in order to form the driver's required brake force and to this end, the brake hydraulic pressure stored in the LPA is supplied to the wheel brake by driving the ESC pump to increase the hydraulic pressure of the wheel brake.

However, in the brake control method, when the second interval ② is entered after passing through the first interval ① and thereafter, the first interval ① is re-entered among the brake force control intervals of FIGS. 1 and 2, a problem occurs due to a hydraulic hysteresis phenomenon depending on the brake pedal stroke.

A signal value of the brake pedal stroke sensor, that is, the pedal stroke varies depending on a degree with which the driver presses the brake pedal and the total brake force (driver's required brake force) required by the driver may be acquired as a value which is proportional to the pedal stroke.

For example, the ESC controller (ESC ECU) may calculate the driver's required brake force (may be acquired as a pressure value in a map, bar) from a signal (pedal stroke, mm) of the brake pedal stroke sensor by using a map (pedal stroke Vs pressure) illustrated in FIG. 3.

Referring to FIG. 3, the brake force of 0 bar needs to be generated in the pedal stroke of 2 mm and the brake force of 10 bar needs to be generated in the pedal stroke of 15 mm and the brake force corresponds to the first interval ① of FIG. 1 and in the first interval ①, the regenerative brake torque corresponding to the driver's required brake force is requested to a hybrid control unit (hereinafter, referred to as 'HCU) to generate the regenerative brake force and the driver's required brake force is satisfied with only the regenerative brake force.

In this case, the regenerative brake torque requested to the HCU may be calculated as below.

Regenerative brake torque=driver's required brake force×conversion coefficient.

Herein, the conversion coefficient is a conversion coefficient for converting, when the driver's required brake force is acquired from the map as a hydraulic pressure value, the hydraulic pressure value into a torque value and in the first interval, the hydraulic brake force is not generated, but the hydraulic pressure corresponds to wheel brake pressure (brake hydraulic pressure of the wheel brake) in the second interval and a hydraulic pressure value corresponding to the regenerative brake force (driver's required brake force) is previously defined as a value depending on the pedal stroke in a map diagram.

When the 'pedal stroke Vs pressure' map illustrated in FIG. 3 is applied, the pedal stroke to determine the driver's required brake force is a value detected by the brake pedal stroke sensor.

The map of FIG. 3 is a map for determining the driver's required brake force in the first interval and in the first interval, the driver's required brake force is satisfied with only the regenerative brake force without generation of the hydraulic brake force.

Therefore, the driver's required brake force in the first interval may be referred to as the regenerative brake force, but as illustrated in FIG. 3, the map diagram in which the brake hydraulic pressure value of the wheel brake corresponding to the regenerative brake force (that is, driver's required brake force) may be acquired from the current pedal stroke, that is, a map diagram in which the brake hydraulic pressure value is defined as a value depending on the pedal stroke may be used.

In the illustrated map diagram of FIG. 3, a pedal stroke value to enter the second interval from the first interval may be set to 15 mm and in the specification, the pedal stroke value to enter the second interval from the first interval will be referred to as an upper threshold stroke and the driver's required brake force (hydraulic pressure value) in the upper threshold stroke will be referred to as a maximum regenerative brake force pressure corresponding value.

In the map diagram of FIG. 3, when the driver's required brake force decreases due to the decrease in pedal stroke and thereafter, the pedal stroke reaches a predetermined low pedal stroke value, the driver's required brake force is '0' and in the specification, the pedal stroke value in which the driver's required brake force is '0', that is, a pedal stroke value in which the brake force is not generated (regenerative brake force=0) will be referred to as a lower threshold stroke.

In the map diagram of FIG. 3, the lower threshold stroke value is set to 2 mm and when the pedal stroke decreases while braking to reach the lower threshold stroke value, the regenerative brake force is '0' by controlling the regenerative brake torque to '0'.

The map diagram of FIG. 3 becomes a linear map diagram in which the driver's required brake force (pressure value) in the lower threshold stroke value is 0 bar and the driver's required brake force in an upper threshold stroke value is the maximum regenerative brake force pressure corresponding value.

In the map diagram of FIG. 3, the upper threshold stroke value is set to 15 mm and a maximum regenerative brake force pressure corresponding value is set to 10 bar.

Therefore, when the driver additionally presses the brake pedal during the regenerative brake cooperation control using the map diagram of FIG. 3, and as a result, the pedal stroke is more than 15 mm which is the upper threshold stroke value, the second interval ② is entered and in the second interval ②, the brake hydraulic pressure is increased to satisfy the driver's required brake force while maintaining the regenerative brake torque, thereby increasing the hydraulic brake force.

In this case, only the hydraulic brake force is appropriately increased and decreased while maintaining the regenerative brake force in order to satisfy the driver's required brake force that varies depending on the pedal stroke which is the driver's pedal press degree.

In the second interval ②, the ESC pump is not also driven while not controlling all of an inlet valve which is a normal open (NO) valve, an outlet valve which is a normal close (NC) valve, and a traction control (TC) valve which is the normal open (NO) valve (the inlet valve is opened, the outlet valve is closed, and the TC valve is opened).

In the second interval ②, pressure generation depending on the pedal stroke has a hysteresis characteristic illustrated in FIG. 4 and FIG. 5.

That is, when required wheel brake pressure increases when the pedal stroke increases to a value more than 15 mm and thereafter, the pedal stroke decreases again to reach 15 mm, the wheel brake pressure is 10 bar in an example of FIG. 4 and the wheel brake pressure is 0 bar when the pedal stroke reaches 20 mm in the example of FIG. 5.

That is, when the pedal stroke decreases to 15 mm or less, the first interval ① is entered and the brake force needs to be generated with only the regenerative brake torque, but in the example of FIG. 4, the regenerative brake torque by the 'pedal stroke Vs pressure' map illustrated in FIG. 3 and the hydraulic brake force by the hysteresis phenomenon are simultaneously generated, and as a result, a superimposition phenomenon of the brake force occurs and in an example of FIG. 5, since the regenerative brake torque is not changed while the pedal stroke reaches 15 mm from 20 mm, the brake force is not changed (the wheel brake pressure is 0 bar).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake control method for a hybrid electric vehicle which may solve a problem associated with a hydraulic hysteresis depending on a pedal stroke when entering a control mode to generate both regenerative brake force and hydraulic brake force from a control mode to generate only the regenerative brake force by increasing a brake pedal stroke in the hybrid electric vehicle in which a regenerative brake cooperation control is performed and thereafter, re-entering the control mode to generate only the regenerative brake force.

According to various aspects of the present invention, a brake control method for a hybrid electric vehicle including a control mode of a first interval to control regenerative brake of a motor with regenerative brake torque corresponding to a pressure value determined from a 'pedal stroke Vs pressure' map based on a pedal stroke depending on an operation of a brake pedal and a control mode of a second interval to control hydraulic pressure of a wheel brake with a wheel brake pressure value determined from a 'pedal stroke Vs wheel brake pressure' map based on a detected pedal stroke when the pedal stroke more than an upper threshold stroke value set in the 'pedal stroke Vs pressure' map is detected may include sensing, by an Electronic Stability Control system controller (ESC ECU), a time when a wheel brake pressure detected by a pressure sensor of the wheel brake is '0' after entering the control mode of the second interval, determining, by the ESC ECU, the pedal stroke in which the wheel brake pressure is '0' from the 'pedal stroke Vs wheel brake pressure' map, changing and setting, by the ESC ECU, the pedal stroke in which the wheel brake pressure is '0' to the upper threshold stroke value of the 'pedal stroke Vs pressure' map, and re-entering the control mode of the first interval, by the ESC ECU, when the pedal stroke depending on the brake pedal operation decreases to the changed upper threshold stroke value or less.

In the control mode of the first interval, regenerative brake force to satisfy driver's required total brake force depending on the brake pedal operation may be generated through the regenerative brake of the motor, and in the control mode of the second interval, hydraulic brake force to satisfy the driver's required total brake force together with a maximum regenerative brake force generated in the control mode of the first interval may be generated through a hydraulic control of the wheel brake.

After re-entering the control mode of the first interval, the 'pedal stroke Vs pressure' map of the control mode of the first interval may be applied while being changed to a diagram connecting a maximum regenerative brake force pressure corresponding value in the changed upper threshold pedal stroke value and 0 bar in a lower threshold stroke value.

The diagram may be a linear diagram and a slope A of the diagram may be determined as A=(maximum regenerative brake force pressure corresponding value)/(Str_p0–lower threshold stroke), wherein Str_p0 is a pedal stroke value in which the wheel brake pressure is '0' as the changed upper threshold pedal stroke value.

When the pedal stroke depending on the brake pedal operation while the control mode of the first interval is performed by entering the first interval is detected as a value larger than the changed upper threshold stroke value, the control mode of the second interval may be entered.

As a result, in a brake control method of a hybrid electric vehicle according to the present invention, it is possible to solve a hydraulic hysteresis problem depending on a pedal stroke shown when a transition between a first interval and a second interval is performed according to a brake pedal press degree (pedal stroke) of a driver.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention is to solve a problem in brake control in the prior art, that is, a hydraulic hysteresis problem depending on a pedal stroke shown when a transition between a first interval and a second interval is performed according to a brake pedal press degree (pedal stroke).

That is, the present invention is to provide an enhanced brake control method to cope with a hydraulic hysteresis phenomenon when entering a second interval to generate both regenerative brake force and hydraulic brake force from a first interval to generate only the regenerative brake force by increasing a brake pedal stroke and thereafter, re-entering the first interval again in a hybrid electric vehicle in which a regenerative brake cooperation control is performed.

Figure 6:
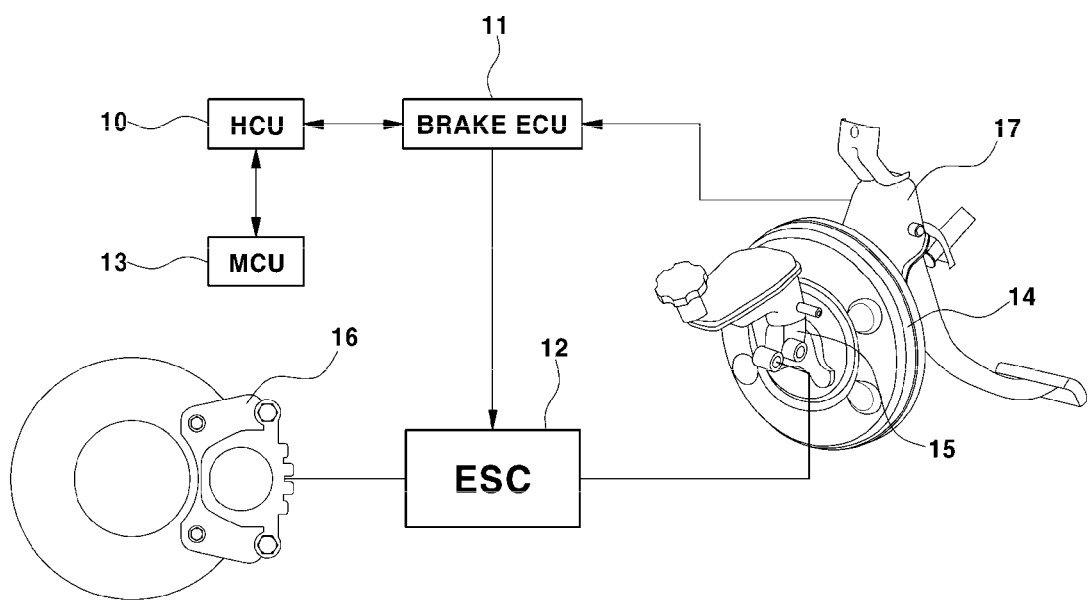
FIG. 6 and FIG. 7 are diagrams schematically illustrating a configuration of a brake control device performing a brake control of the present invention.
Figure 7:
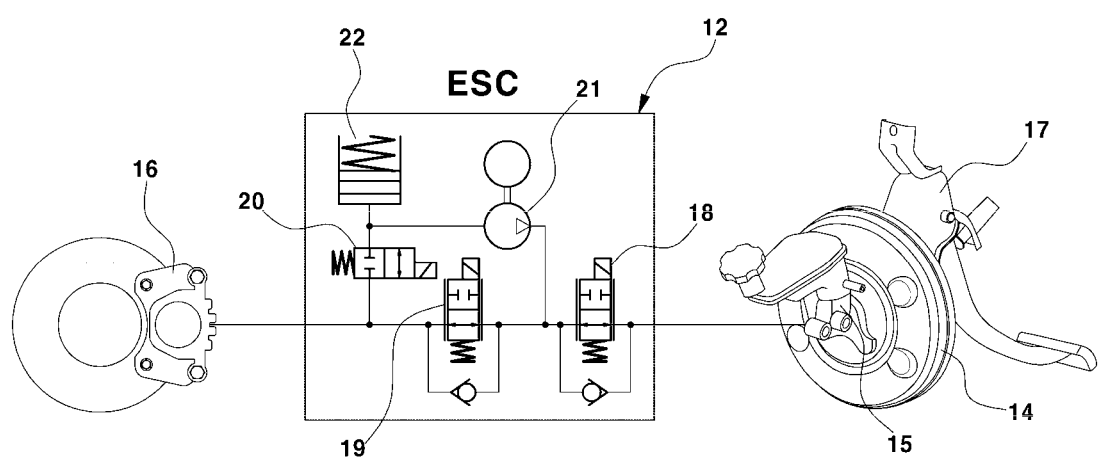

As illustrated in FIG. 6 and FIG. 7, a brake control device performing a brake control of the present invention includes a hybrid control unit (HCU) 10, a brake electric control unit (ECU) 11, an electronic stability control (ESC) system 12, a motor control unit (MCU) 13, a master cylinder 14, a hydraulic booster 15, a wheel brake 16, a pedal stroke sensor 17 detecting a pedal stroke depending on a driver's operation of a brake pedal, a pressure sensor detecting wheel brake pressure of a wheel brake (for example, left wheel and right wheel brakes of a front wheel), a pressure sensor (not illustrated) detecting the pressure of the master cylinder, and the like.

The HCU 10 as a top control unit is connected with each control unit constituted in the hybrid electric vehicle through a network to control all operations of a movement of a vehicle and the regenerative brake cooperation control.

The brake ECU 11 is connected with the HCU 10 through the network to exchange control information and analysis information with the HCU 10, receives a signal of the brake pedal stroke sensor 17 which is a driver's brake request, that is, a pedal stroke signal to determine driver's required brake force (total brake force) depending on the pedal stroke, distributes the regenerative brake force and the hydraulic brake force for satisfying the driver's required brake force, and thereafter, adjusts the flow of a brake oil liquid supplied to the wheel brake 16 by operating the ESC 12 so as to generate the determined hydraulic brake force (hydraulic brake force).

The ESC 12 which controls brake hydraulic pressure of the wheel brake 16 to generate the hydraulic brake force determined depending on the pedal stroke signal in the brake ECU 11 while braking includes a traction control (TC) valve 18 connected between the master cylinder 14 and the ESC pump 21 (alternatively, inlet valve) through the hydraulic booster 15, an inlet valve 19 connected between the TC valve 18 and the wheel brake 16 (alternatively, outlet valve), an outlet valve 20 of which one side is connected between the inlet valve 19 and the wheel brake 16, and a low pressure accumulator (LPA) 22 connected to the outlet valve 20 and the ESC pump 21.

The TC valve 18 and the inlet valve 19 are normal open (NO) type valves and the TC valve 18 serves to cut off a path between the master cylinder 14 and the ESC pump 21 so as to prevent pressure generated in the ESC pump 21 from being transferred to the master cylinder 14 as the TC valve 18 is closed when while hydraulic pressure generated in the master cylinder 14 is transferred to the inlet valve 19 in an open state, the regenerative brake is released, and as a result, the regenerative brake force is decreased and the ESC pump 21 is driven.

The inlet valve 19 serves to transfer to the wheel brake 16 the hydraulic pressure transferred through an output terminal (alternatively, an input terminal of the inlet valve) path of the TC valve 18 in the open state.

The outlet valve 20 as a normal close (NC) type valve serves to decrease pipe pressure between the master cylinder 14 and the wheel brake 16 by discharging the hydraulic pressure (that is, the hydraulic pressure supplied from the master cylinder to the wheel brake) of the wheel brake 16 to the LPA 22 in the open state when the regenerative brake force increases.

The ESC pump 21 pumps a brake oil liquid of the LPA 22 and supplies the pumped brake oil liquid to the wheel brake 16 to increase brake pressure depending on an added pedal stroke when brake force more than allowable maximum regenerative brake force is required.

In this case, the outlet valve 20 is controlled to be a closed state.

Although not illustrated, the ESC 12 includes the ECU (that is, ESC ECU) and the ECU controls driving of a valve and a pump in the ESC 12 according to the signal received from the brake ECU 11.

The master cylinder 14 generates the hydraulic pressure required for generating the brake force and supplies the generated hydraulic pressure to the wheel brake through the ESC 12 and the hydraulic booster 15 serves to increase hydraulic pressure of the master cylinder 14.

The wheel brake 16 restrains a wheel of a vehicle according to the pressure of the brake oil liquid supplied through the ESC 12 to generate the hydraulic brake force (friction brake force).

The MCU 13 is connected with the HCU 10 through the network to exchange the control information and the analysis information with the HCU 10, and receives a control signal (regenerative brake torque command) depending on a regenerative brake torque amount output from the HCU 10 to execute a regenerative brake torque control by the motor, thereby charging a battery.

Figure 8:
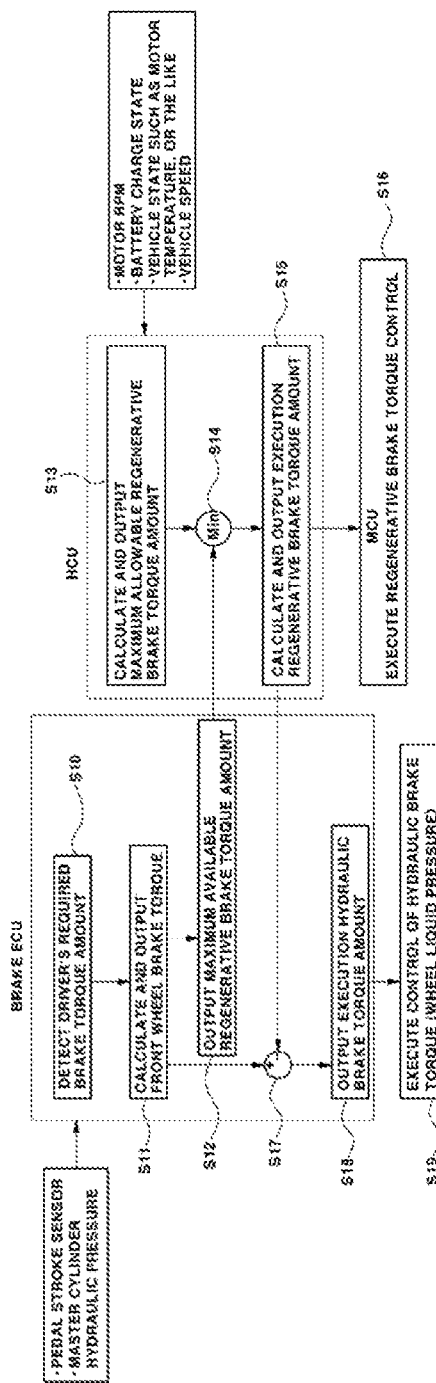
FIG. 8 is a flowchart illustrating a regenerative brake cooperation control process of the hybrid electric vehicle.

A basic operation of the ESC based brake control device configured as above and a basic process of the regenerative brake cooperation control using the ESC are not different from those in the prior art except for a hydraulic hysteresis control to be described below and will be described below with reference to the control mode for each brake interval of FIG. 1 and FIG. 2 and the flowchart of FIG. 8.

When the driver requests braking such as deceleration or stop by pressing the brake pedal while the vehicle is driven at a predetermined speed, the brake pedal stroke sensor 17 detects the pedal stroke depending on the driver's pedal press degree and outputs a detection signal (pedal stroke signal) to the brake ECU 11, the master cylinder 14 generates pressure in the brake oil liquid according to the pedal stroke, and the brake ECU 11 recognizes master cylinder hydraulic pressure through a master cylinder pressure sensor.

As a result, the brake ECU 11 determines the driver's required brake torque amount required by the driver according to the pedal stroke signal (S10), calculates a front wheel brake torque amount for front-wheel brake according to the driver's required brake torque amount (S11), and calculates a maximum available regenerative brake torque amount which may be maximally braked by regenerative braking in the front wheel brake torque amount and outputs and transmits the calculated maximum available regenerative brake torque amount to the HCU 10 (S12).

In this case, the HCU 10 calculates the maximum allowable regenerative brake torque amount which is maximally allowable based on information such as an RPM of an electric motor, a battery charge state, a vehicle speed, an electric motor temperature, and the like (S13), compares the calculated maximum allowable regenerative brake torque amount with the maximum available regenerative brake torque amount received in the brake ECU 11 (S14), and determines a smaller value between both amounts as an execution regenerative brake torque amount for executing actual regenerative brake and thereafter, output and transmits the determined value to the MCU 13 (S15).

Therefore, the MCU 13 executes the regenerative brake torque control for the electric motor according to the received execution regenerative brake torque amount (S16).

The brake ECU 11 subtracts the execution regenerative brake torque amount received from the HCU 10 from the front wheel brake torque amount calculated in the brake ECU 11 (S17) and calculates an execution hydraulic brake torque amount for executing actual hydraulic brake and thereafter, outputs the calculated execution hydraulic brake torque amount to the ESC (ESC ECU) (S18).

Therefore, the ESC 12 executes a hydraulic brake control to control the hydraulic brake torque (brake hydraulic pressure of the wheel brake, that is, wheel liquid pressure) according to the execution hydraulic brake torque amount received from the brake ECU 11 (S19).

Next, the hydraulic brake control process through the ESC 12 during the regenerative brake cooperation control will be described with reference to FIG. 1 and FIG. 2.

The ESC 12 controls the brake hydraulic pressure supplied to the wheel brake 16 according to the control mode for each brake interval as described below during the regenerative brake cooperation control.

Figure 1:
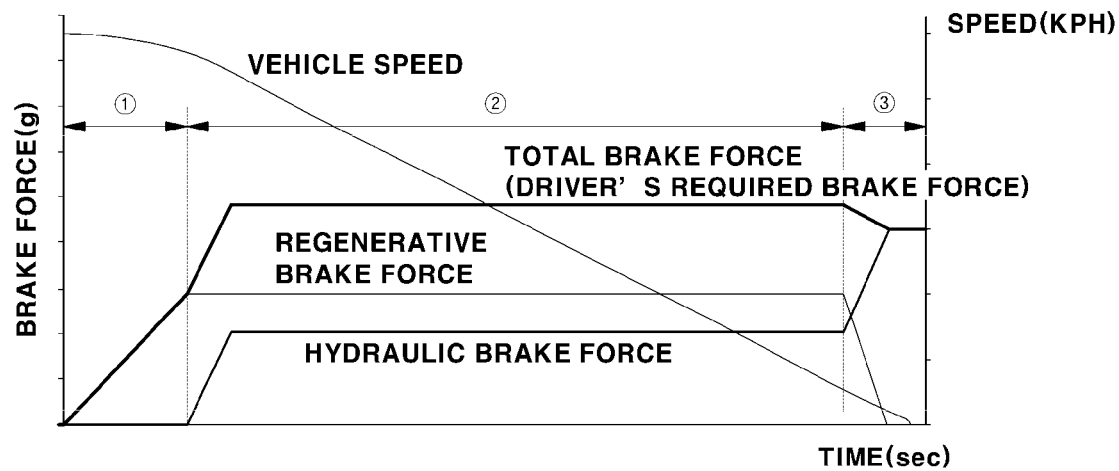
FIG. 1 and FIG. 2 are diagrams illustrating a control mode for each brake interval in a hybrid electric vehicle in which a regenerative brake cooperation control is performed.

As illustrated in FIG. 1, the control mode for each brake interval may be divided based on the regenerative brake force while braking and classified into a first interval ① of performing braking only by the regenerative brake force, a second interval ② of constantly maintaining the regenerative brake force at a maximum value and increasing the brake hydraulic pressure according to driver's brake pedal pressing, and a third interval ③ of increasing the brake hydraulic pressure as much as the decrease amount of the regenerative brake force by releasing the regenerative brake.

In the first interval ① as an interval in which the driver's required brake force (alternatively, driver's required brake torque amount) is brake force corresponding to 0.1 g or less based on the deceleration as one example, braking is performed only by the regenerative brake force of the motor without the hydraulic brake force, and the brake hydraulic pressure supplied from the master cylinder 14 is stored in the LPA 22 by opening the outlet valve 20 of the ESC 12 to prevent the brake hydraulic pressure of the wheel brake 16 from being increased.

When the driver presses the brake pedal, the hydraulic pressure is generated in a pipe from the master cylinder 14 up to the wheel brake, but required vehicle braking may be performed only by the regenerative brake force in an initial braking stage such as the first interval, and as a result, a control of increasing and decreasing the regenerative brake force is performed according to the driver's pedal press degree without the hydraulic brake while discharging the brake oil liquid to the LPA 22 by opening the outlet valve 20 of the ESC 12 in order to minimize the generation of the hydraulic pressure in the first interval and decreasing the pipe pressure up to the wheel brake from the master cylinder 14 through the discharged brake oil liquid.

In the second interval ②, the maximum value (maximum regenerative brake force) increased and formed in the first interval is just maintained with respect to the regenerative brake force and when the brake force more than the regenerative brake force is required by due to additional pressing of the brake pedal by a driver, the brake hydraulic pressure is increased to generate the hydraulic brake force.

In the second interval ② as an interval in which brake force larger than the brake force which may be output with the regenerative brake force is required, the outlet valve 20 connected to the LPA 22 is closed to allow the wheel brake 16 to receive the brake hydraulic pressure of the master cylinder 14 formed according to the driver's pedal operation amount and the brake hydraulic pressure of the wheel brake 16 may be thus increased and decreased according to the brake pedal operation amount.

Figure 4:
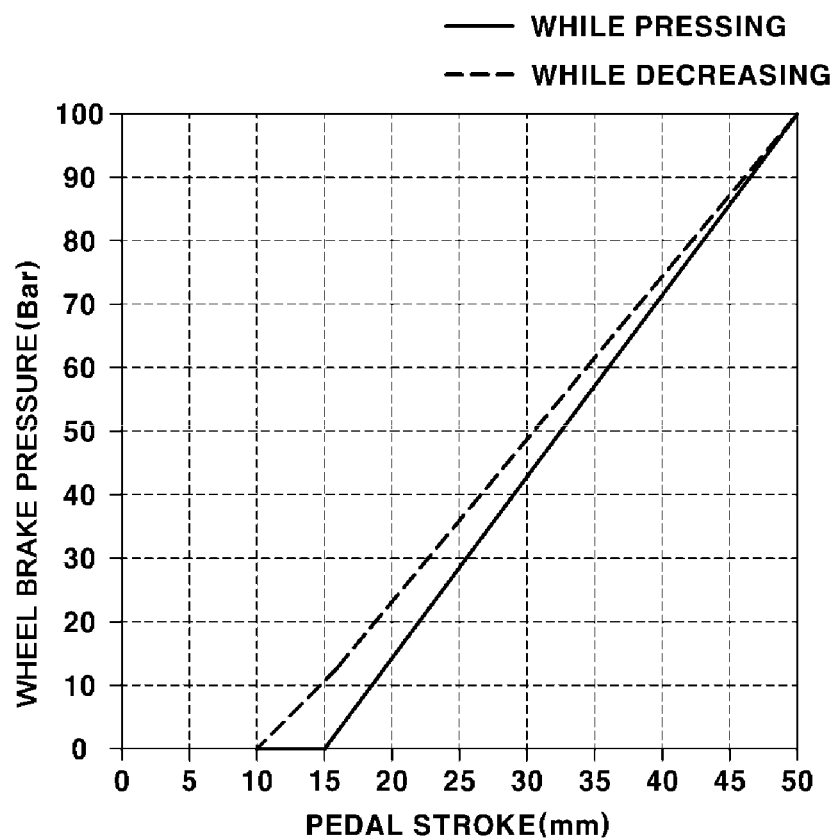
FIG. 4 and FIG. 5 are diagrams illustrating a hysteresis characteristic of pressure generation depending on a pedal stroke in a second interval of FIG. 1 and FIG. 2.
Figure 5:
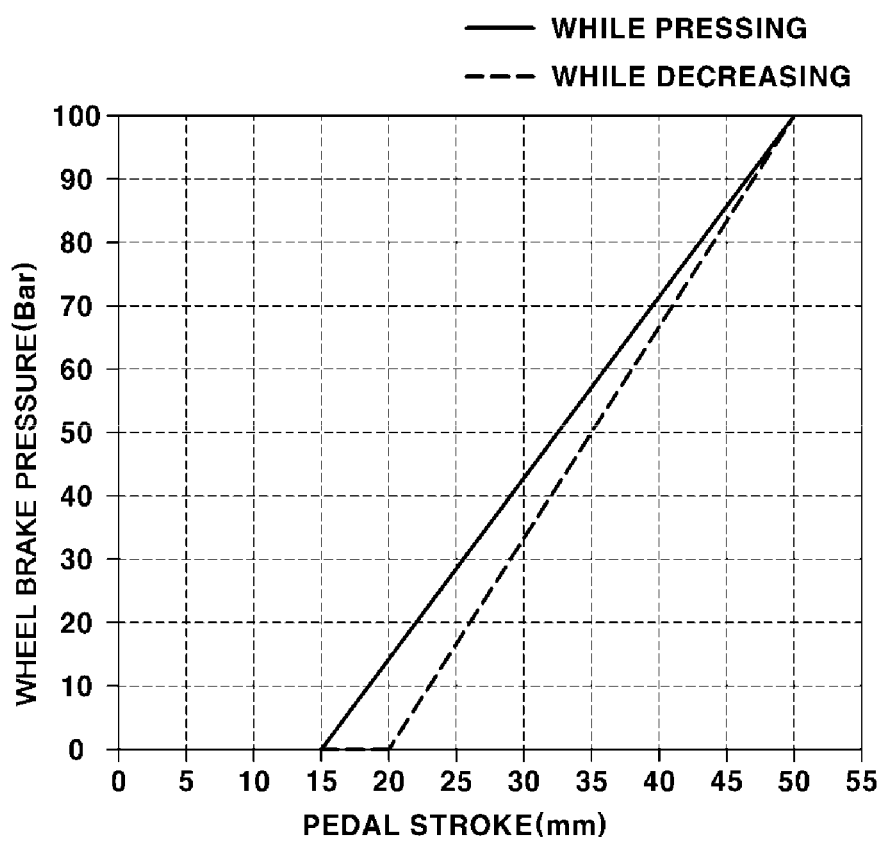

In the second interval ②, the driver's brake pedal operation amount, that is, the brake hydraulic pressure corresponding to the signal value (that is, pedal stroke value) of the brake pedal stroke sensor 17 may be determined from the 'pedal stroke Vs wheel brake pressure' map illustrated in FIGS. 4 and 5.

The third interval ③, is an interval in which the regenerative brake is released, and as a result, the regenerative brake amount decreases and in this interval, the hydraulic brake force is increased as much as the decrease amount of the regenerative brake force in order to satisfy the driver's required total brake force, and to this end, the brake hydraulic pressure stored in the LPA 22 is supplied to the wheel brake 16 by driving the ESC pump 21 to increase the hydraulic pressure of the wheel brake 16.

In this case, the TC valve 18 is closed in order to allow the hydraulic pressure to influence only the wheel brake 16 without influencing the master cylinder 14.

Subsequently, when the hydraulic pressure reaches target pressure, the driving of the ESC pump 21 is stopped.

In the system in the related art, a separate pedal simulator is present and the hydraulic booster directly controls the pipe pressure from the master cylinder to the wheel brake, but in the system of FIG. 6 and FIG. 7 using the ESC, the pedal simulator is deleted.

The regenerative brake cooperation control is performed by controlling the hydraulic pressure supplied to the wheel brake 16 during the regenerative braking through the ESC 12 and in this case, boosting force of the hydraulic booster 15 is used for generation of basic hydraulic pressure and an increase in hydraulic pressure is implemented by driving the ESC 12 during the regenerative brake cooperation control.

Figure 2:
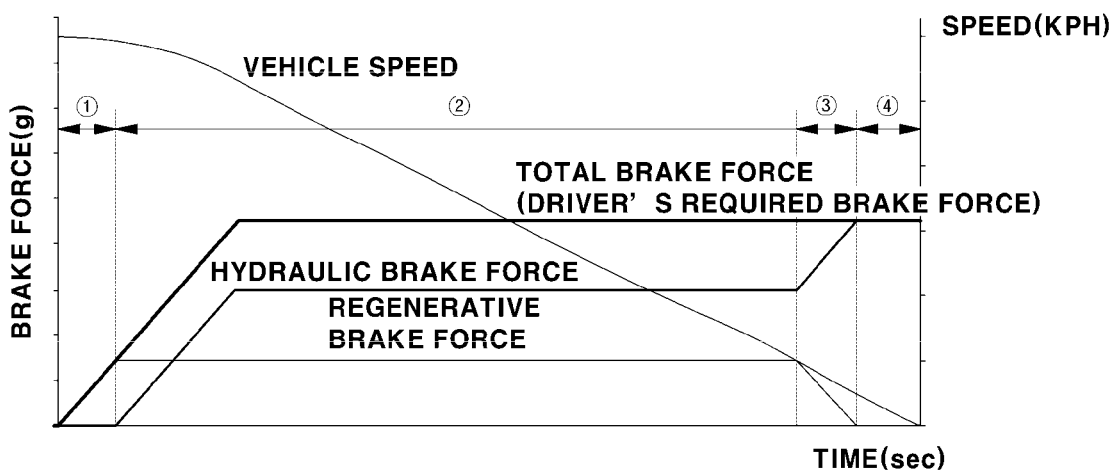

The control mode (brake force control mode) for each brake interval may further include a fourth interval ④ in addition to the first to third intervals ①, ②, and ③ similar to the control mode of FIG. 1 as illustrated in FIG. 2.

The hydraulic brake control process through the ESC during the regenerative brake cooperation control in the first to third intervals of FIG. 1 is performed similarly as described above and the fourth interval ④ may be included after the third interval, and in the example of FIG. 2, in the third interval, the total brake force does not decrease and is maintained similarly as in the second interval and the total brake force is maintained similarly through the hydraulic braking even in the fourth interval in addition to the third interval.

The respective valves 18 to 20 and the pump 21 in the ESC 12 therefore operate in an operation mode shown in Table 1 given below.

TABLE 1

| | | Operation mode during braking | | | | | |
|---|---|---|---|---|---|---|---|
| | Interval | Before braking | First interval | Second interval | Third interval | Fourth interval | After braking (released) |
| valve | Inlet valve(ON) | Open | Open | Open | Open | Open | Open |
| | Outlet valve(NC) | Close | Open | Close | Close | Close | Close |
| | TC valve(ON) | Open | Open | Open | Close | Close | Open |
| | Pump | OFF | OFF | OFF | ON | OFF | OFF |

Figure 9:
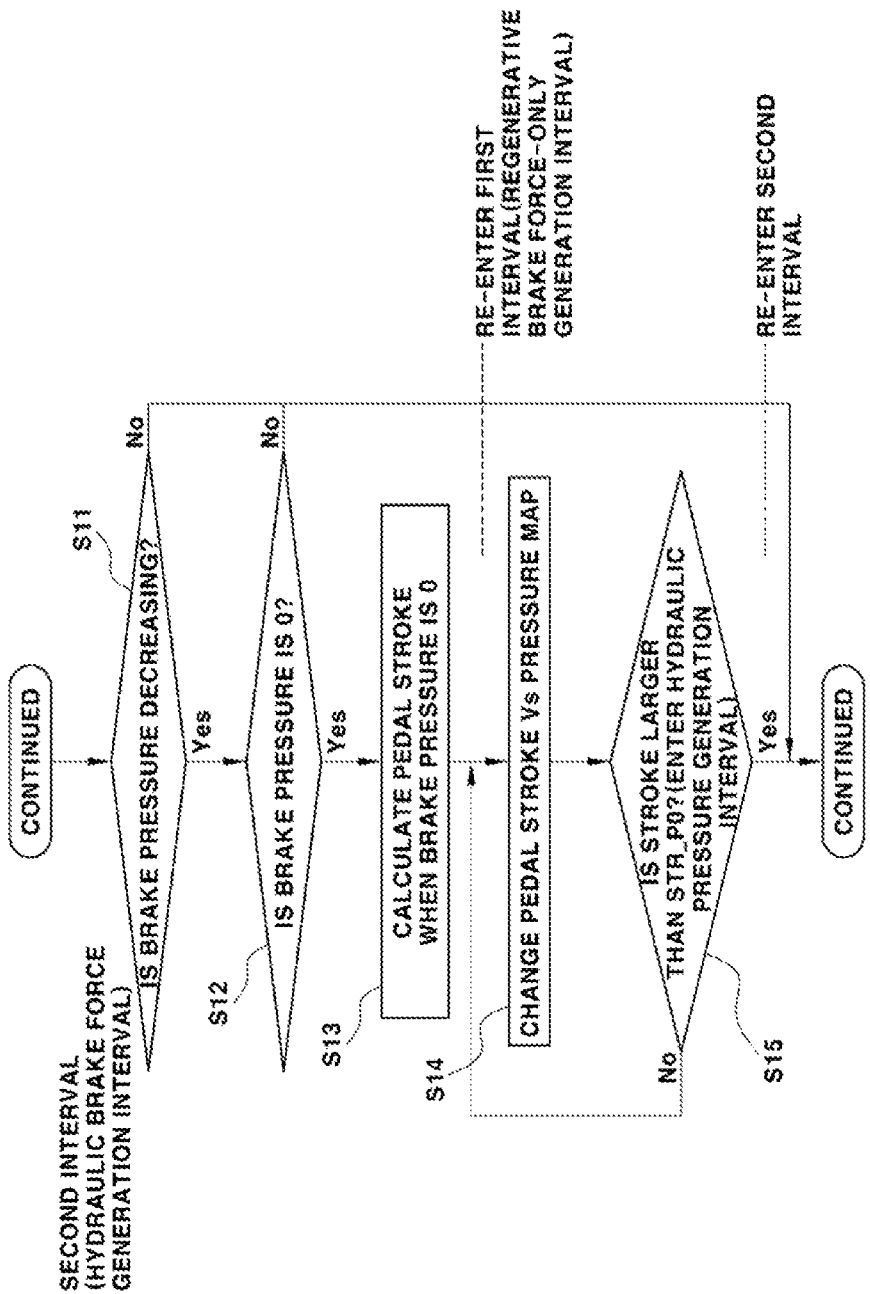
FIG. 9 is a flowchart illustrating a hydraulic hysteresis control process according to an exemplary embodiment of the present invention.

Next, the hydraulic hysteresis control process according to the present invention will be described with reference to FIG. 9.

In the hydraulic hysteresis control process, a wheel brake pressure sensor detecting wheel brake pressure (brake pressure) of the wheel brake installed at each wheel is used and when it is assumed that the wheel brakes are installed at the left wheel and the right wheel of the front wheel in a general mild hybrid electric vehicle in which the regenerative brake cooperation control is performed, a total of two wheel brake pressure sensors installed at the wheel brake of the left wheel and the wheel brake of the right wheel, respectively to detect wheel brake pressure of the corresponding wheel brake may be used.

A pressure detection signal output by each wheel brake pressure sensor, that is, a signal indicating the wheel brake pressure (brake hydraulic pressure of the wheel brake) is input into the ESC ECU.

Figure 3:
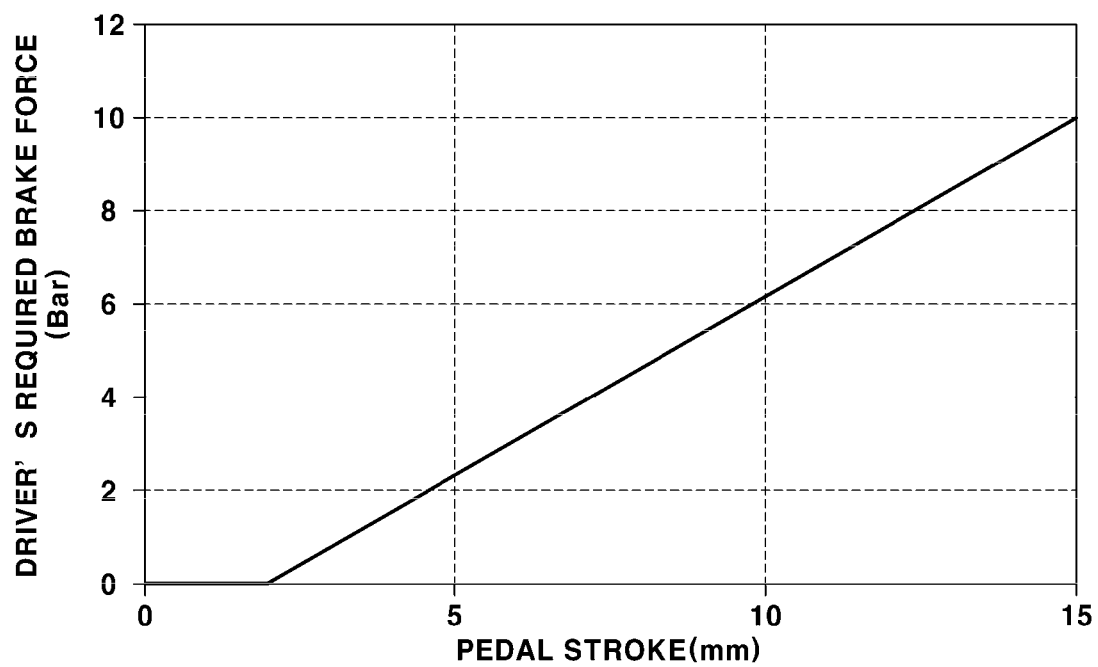
FIG. 3 is a diagram illustrating a pedal stroke Vs pressure map for calculating a regenerative brake torque value in a first interval of FIG. 1 and FIG. 2.

First, when the driver presses the brake pedal, and as a result, the driver's required brake force increases to a level more than the maximum regenerative brake force, that is, when the pedal stroke detected by the brake pedal stroke sensor 17 is more than 15 mm which is the upper threshold stroke value shown in the map of FIG. 3, since the driver's required brake force may not be satisfied with only the regenerative brake force, the second interval ② of additionally generating the hydraulic brake force is entered.

When the second interval ② is entered and thereafter, the ESC ECU determines that the wheel brake pressure, that is, the brake pressure of the wheel brake decreases from the signal of the wheel brake pressure sensor (S11), the ESC ECU senses a time when the wheel brake pressure (brake pressure) is '0' from the signal of the wheel brake pressure sensor (S12).

Herein, the time when the wheel brake pressure is '0' means a time when average pressure of wheel brake pressure detected at the left wheel of the front wheel and wheel brake pressure detected at the right wheel is '0'.

When the wheel brake pressure (brake pressure) is '0' as described above, a value of a pedal stroke Str_p0 in which the wheel brake pressure is '0' is calculated from the 'pedal stroke Vs wheel brake pressure' map shown in FIGS. 4 and 5 used in the wheel brake hydraulic control in the second interval ②.

In the map of FIG. 4, when the second interval is entered and thereafter, the pedal stroke decreases and the wheel brake pressure decreases to become '0', the pedal stroke Str_p0 is 10 mm and in the map of FIG. 5, when the wheel brake pressure is '0', the pedal stroke Str_p0 is 20 mm.

In the first interval ①, in the map of FIG. 3 for the regenerative brake control (in particular, determining the driver's required brake force(=regenerative brake force) and the regenerative brake torque), the lower threshold stroke value in which the driver's required brake force is '0' is 2 mm and the maximum regenerative brake force pressure corresponding value is set to 10 bar.

Figure 10A:
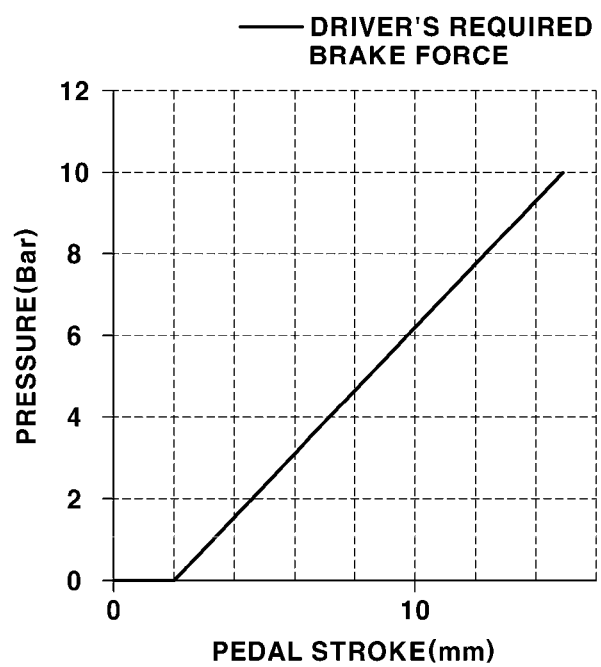
FIG. 10A, FIG. 10B, FIG. 11A, and FIG. 11B are diagrams illustrating a pedal stroke Vs pressure map changed during the hydraulic hysteresis control process.
Figure 10B:
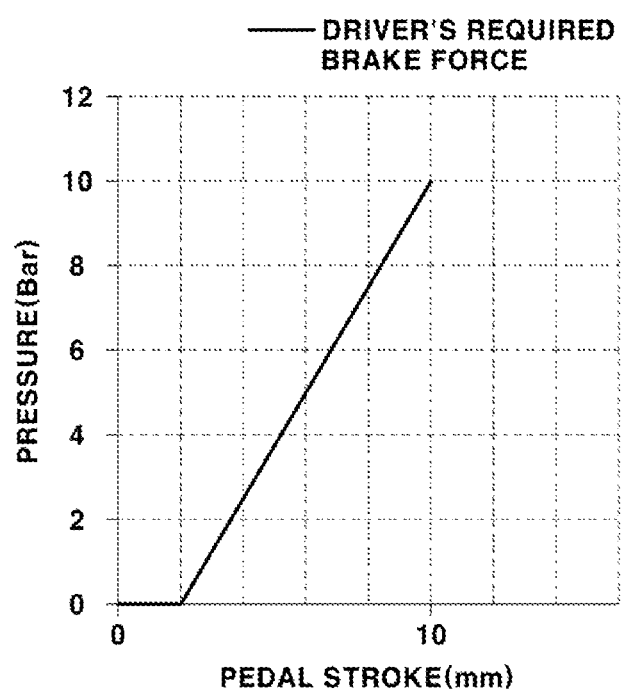
Figure 11A:
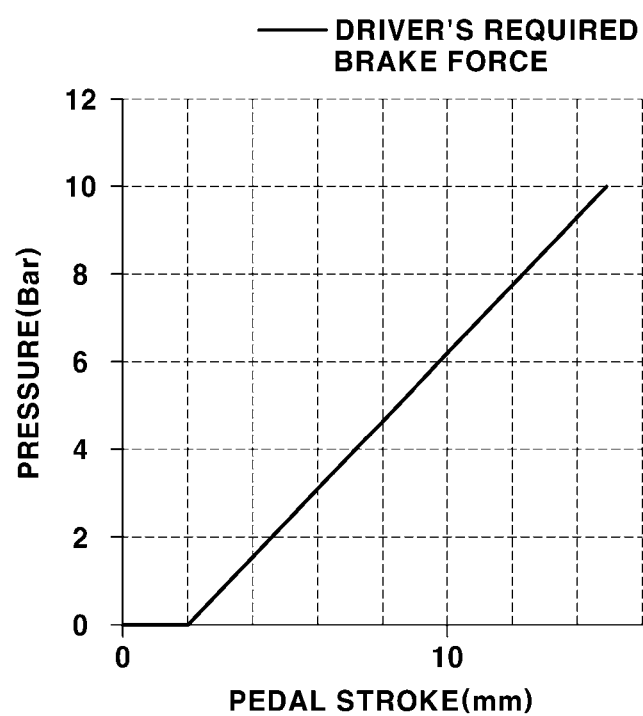
Figure 11B:
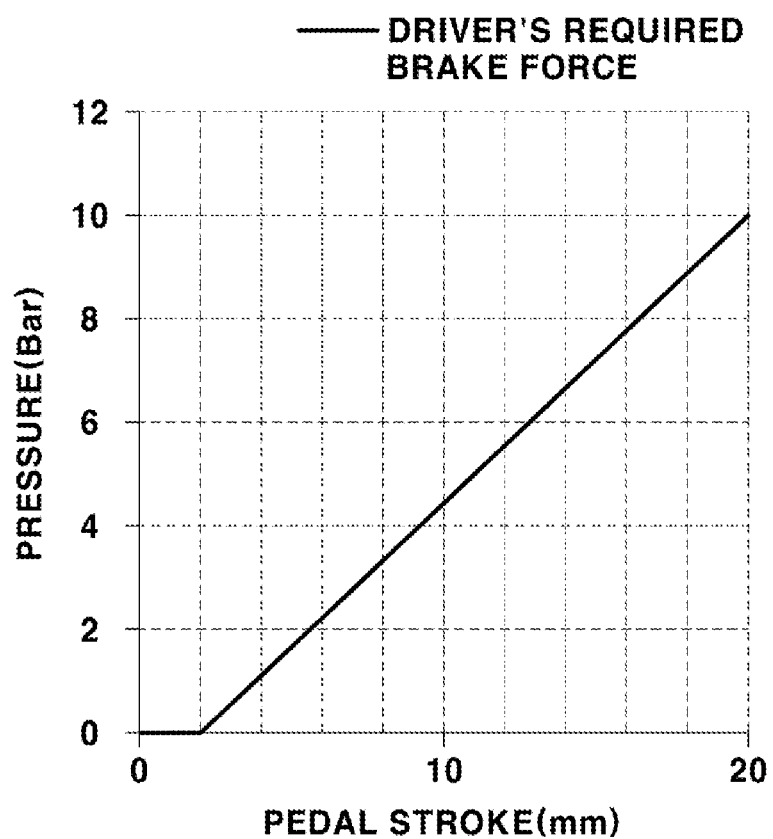

Consequently, after the value of the pedal stroke Str_p0 is acquired when the wheel brake pressure is '0', the acquired value is reset as the upper threshold stroke value and thereafter, when the pedal stroke detected through the brake pedal stroke sensor 17 decreases to the reset upper threshold stroke value or less, the first interval ① is entered and the map diagram of FIG. 3 for determining the driver's required brake force and the regenerative brake torque is applied while being changed as illustrated in FIGS. 10 to 11B (S14).

That is, by using the 'pedal stroke Vs pressure' map illustrated in FIG. 10B or 11B, the driver's required brake force for generating the regenerative brake force in the first interval ① is determined and the regenerative brake torque value for performing the motor regenerative brake control to satisfy the driver's required brake force is determined.

Referring to FIGS. 10B and 11B, the upper threshold stroke value for determining whether to enter the first interval ① from the second interval ② based on the pedal stroke signal is changed to the value of the pedal stroke Str_p0 corresponding to the wheel brake pressure of '0' and a linear diagram connecting the maximum regenerative brake force pressure corresponding value of 10 bar set in the upper threshold stroke value and 0 bar in the lower threshold stroke value after entering the first interval ① is used as the map diagram for determining the driver's required brake force from the pedal stroke in the first interval ①.

Herein, a slope A of the map diagram may be determined by the following equation.

$$A=(\text{maximum regenerative brake force pressure corresponding value})/(\text{Str\_p0}-\text{lower threshold stroke}).$$

For example, the slope A of the map diagram of the 'pedal stroke Vs pressure' map illustrated in FIG. 10B becomes (10 bar)/(10 mm−2 mm)=1.25 and the slope A of the map diagram of the 'pedal stroke Vs pressure' map illustrated in FIG. 11B becomes (10 bar)/(20 mm−2 mm)=0.56.

When the pedal stroke value depending on the driver's brake pedal operation is more than a newly changed upper threshold stroke value after re-entering the first interval ① from the second interval ②, the second interval ② is entered again (S15).

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake control method for a hybrid electric vehicle including a control mode of a first interval to control regenerative brake of a motor with regenerative brake torque corresponding to a pressure value determined from a 'pedal stroke Vs pressure' map based on a pedal stroke depending on an operation of a brake pedal and a control mode of a second interval to control hydraulic pressure of a wheel brake with a wheel brake pressure value determined from a 'pedal stroke Vs wheel brake pressure' map based on a detected pedal stroke when the pedal stroke more than an upper threshold stroke value set in the 'pedal stroke Vs pressure' map is detected, the method comprising:
    sensing, by an Electronic Stability Control system controller (ESC ECU), a time when a wheel brake pressure detected by a pressure sensor of the wheel brake is '0' after entering the control mode of the second interval;
    determining, by the ESC ECU, the pedal stroke in which the wheel brake pressure is '0' from the 'pedal stroke Vs wheel brake pressure' map;
    changing and setting, by the ESC ECU, the pedal stroke in which the wheel brake pressure is '0' to the upper threshold stroke value of the 'pedal stroke Vs pressure' map; and
    re-entering the control mode of the first interval, by the ESC ECU, when the pedal stroke depending on the brake pedal operation decreases to the changed upper threshold stroke value or less.

2. The method of claim 1, wherein in the control mode of the first interval, regenerative brake force to satisfy driver's required total brake force depending on the brake pedal operation is generated through the regenerative brake of the motor, and
    in the control mode of the second interval, hydraulic brake force to satisfy the driver's required total brake force together with a maximum regenerative brake force generated in the control mode of the first interval is generated through a hydraulic control of the wheel brake.

3. The method of claim 1, wherein after re-entering the control mode of the first interval, the 'pedal stroke Vs pressure' map of the control mode of the first interval is applied while being changed to a diagram connecting a maximum regenerative brake force pressure corresponding value in the changed upper threshold pedal stroke value and 0 bar in a lower threshold stroke value.

4. The method of claim 3, wherein the diagram is a linear diagram and a slope A of the diagram is determined as A=(maximum regenerative brake force pressure corresponding value)/(Str_p0−lower threshold stroke), wherein Str_p0 is a pedal stroke value in which the wheel brake pressure is '0' as the changed upper threshold pedal stroke value.

5. The method of claim 1, wherein when the pedal stroke depending on the brake pedal operation while the control mode of the first interval is performed by entering the first interval is detected as a value larger than the changed upper threshold stroke value, the control mode of the second interval is entered.

* * * * *